US011643778B2

(12) United States Patent
Gingras

(10) Patent No.: US 11,643,778 B2
(45) Date of Patent: May 9, 2023

(54) DISPERSER PLATES WITH INTERMESHING TEETH AND OUTER REFINING SECTION

(71) Applicant: ANDRITZ INC., Alpharetta, GA (US)

(72) Inventor: Luc Gingras, Harrogate (GB)

(73) Assignee: Andritz Inc., Alpharetta, GA (US)

( * ) Notice: Subject to any disclaimer, the term of this patent is extended or adjusted under 35 U.S.C. 154(b) by 53 days.

(21) Appl. No.: 17/451,027

(22) Filed: Oct. 15, 2021

(65) Prior Publication Data

US 2022/0034034 A1  Feb. 3, 2022

Related U.S. Application Data

(62) Division of application No. 16/362,070, filed on Mar. 22, 2019, now Pat. No. 11,174,592.

(Continued)

(51) Int. Cl.
*D21D 1/30* (2006.01)
*D21D 1/00* (2006.01)
(Continued)

(52) U.S. Cl.
CPC .............. *D21D 1/008* (2013.01); *B02C 7/12* (2013.01); *D21C 5/02* (2013.01); *D21D 1/303* (2013.01); *D21D 1/306* (2013.01)

(58) Field of Classification Search
CPC ........... D21D 1/303; D21D 1/306; D21D 1/30
See application file for complete search history.

(56) References Cited

U.S. PATENT DOCUMENTS 2,988,290 A   6/1961 Merges
3,055,598 A * 9/1962 Ginaven ............... D21D 1/30
                                            241/251

(Continued)

FOREIGN PATENT DOCUMENTS

CN   1391501 A   1/2003
CN   1412385 A   4/2003
(Continued)

OTHER PUBLICATIONS

"Disperser Plates With Intermeshing Teeth and Outer Refining Section", Affidavit of Michael Chaney, Nov. 8, 2019, pp. 1-5.
(Continued)

*Primary Examiner* — Faye Francis
(74) *Attorney, Agent, or Firm* — Kilpatrick Townsend & Stockton LLP

(57) ABSTRACT

A disperser apparatus includes: a first disperser assembly configured to rotate around an axis; and a second disperser assembly facing the first disperser assembly. The first and second disperser assemblies each have a plurality of disperser-refiner plate segments annularly arranged. Each of the disperser-refiner plate segments includes a substrate having teeth extending from the substrate and arranged in rows disposed at radial intervals defining a dispersion section. Each tooth has a tooth height; and walls; and edges at junctions of adjacent walls. Each of the disperser-refiner plate segments further includes a refining section of refiner bars extending from the substrate, wherein adjacent refiner bars and the substrate define a groove between the adjacent refiner bars; and a plurality transition bars disposed between radially outermost teeth and the refining section.

13 Claims, 4 Drawing Sheets

Related U.S. Application Data

(60) Provisional application No. 62/651,777, filed on Apr. 3, 2018.

(51) Int. Cl.
    *B02C 7/12*     (2006.01)
    *D21C 5/02*     (2006.01)

(56) References Cited

U.S. PATENT DOCUMENTS

| | | | | |
|---|---|---|---|---|
| 3,552,664 | A | * | 1/1971 | Herbert .................. D21D 1/303 241/261.3 |
| 4,627,578 | A | * | 12/1986 | Whyte ................... D21D 1/303 241/34 |
| 4,820,381 | A | * | 4/1989 | Brown .................... D21D 1/30 241/245 |
| 5,042,726 | A | | 8/1991 | Reinhall |
| 5,248,099 | A | * | 9/1993 | Lahner .................. D21D 1/303 241/261.3 |
| 5,335,865 | A | * | 8/1994 | Kohler ................... D21D 1/30 241/261.3 |
| 5,704,559 | A | | 1/1998 | Froeberg et al. |
| 5,863,000 | A | | 1/1999 | Gingras |
| 6,053,440 | A | * | 4/2000 | LaRiviere .............. D21D 1/303 241/261.3 |
| 6,325,308 | B1 | | 12/2001 | Lofgren et al. |
| 6,969,019 | B2 | | 11/2005 | Aikawa |
| 7,172,148 | B2 | | 2/2007 | Cassidy |
| 7,354,011 | B2 | | 4/2008 | Virving |
| 7,458,533 | B2 | | 12/2008 | Gingras |
| 7,478,733 | B2 | | 1/2009 | Hsu |
| 7,478,773 | B2 | | 1/2009 | Gingras et al. |
| 7,758,726 | B2 | | 7/2010 | Sabourin et al. |
| 10,794,003 | B2 | | 10/2020 | Anderson |
| 2003/0071153 | A1 | | 4/2003 | Aikawa |
| 2004/0149844 | A1 | * | 8/2004 | Antensteiner .......... D21D 1/306 241/298 |
| 2007/0158422 | A1 | | 7/2007 | Mazzone et al. |
| 2007/0158482 | A1 | | 7/2007 | Gingras et al. |
| 2013/0015281 | A1 | * | 1/2013 | Gingras ................. D21D 1/306 241/296 |
| 2014/0110511 | A1 | * | 4/2014 | Antensteiner .......... D21D 1/306 241/261.3 |
| 2014/0196858 | A1 | | 7/2014 | Gingras |
| 2015/0306603 | A1 | * | 10/2015 | Wu .......................... B02C 18/12 241/245 |
| 2017/0362773 | A1 | | 12/2017 | Lindblom |
| 2020/0399826 | A1 | * | 12/2020 | Virtanen ................. B02C 23/20 |
| 2021/0017706 | A1 | * | 1/2021 | Lindblom ................ B02C 7/12 |

FOREIGN PATENT DOCUMENTS

| | | |
|---|---|---|
| CN | 1718921 A | 1/2006 |
| CN | 100999877 A | 7/2007 |
| CN | 101831828 A | 9/2010 |
| CN | 201713720 | 1/2011 |
| CN | 102348849 A | 2/2012 |
| CN | 203715984 U | 7/2014 |
| DE | 4210207 | 9/1993 |
| DE | 202014010374 U1 | 6/2015 |
| EP | 1806451 | 7/2007 |
| JP | H05501288 A | 3/1993 |
| JP | 2001149804 A | 6/2001 |
| JP | 2003119648 A | 4/2003 |
| JP | 2003119684 A | 4/2003 |
| JP | 2007182660 A | 7/2007 |
| RU | 2607753 C2 | 1/2017 |
| TW | 200726870 | 7/2007 |
| WO | 9926725 | 6/1999 |
| WO | 9954046 | 10/1999 |
| WO | 0137998 | 5/2001 |
| WO | 2001037998 A2 | 5/2001 |

OTHER PUBLICATIONS

"Refiner Plate Drawing No. 91-063", U&L Fiber Services, Apr. 15, 1991.
"Refiner Plate Drawing No. 91-064", U&L Fiber Services, Apr. 17, 1991.
"Sales Order History Excerpt", U&L, Mar. 13, 1991, 1 page.
U.S. Appl. No. 16/362,070 , "Letter Regarding US Patent Application Number", Nov. 4, 2019, 2 pages.
U.S. Appl. No. 16/362,070 , Non-Final Office Action, dated Jun. 3, 2021, 7 pages.
U.S. Appl. No. 16/362,070 , Non-Final Office Action, dated Apr. 26, 2021, 9 pages.
U.S. Appl. No. 16/362,070 , Notice of Allowance, dated Jul. 23, 2021, 7 pages.
Application No. EP19166479.6 , Extended European Search Report, dated Aug. 5, 2019, 6 pages.
Application No. TW108111728 , Notice of Decision to Grant, dated Aug. 31, 2021, 2 pages.
Application No. TW108111728 , Office Action, dated Jan. 21, 2021, 17 pages.
Application No. TW20198111728 , Office Action, dated Sep. 17, 2019, 15 pages.
Japan Patent Application No. 2019-062754, Office Action, dated Aug. 30, 2022.
China Patent Application No. 201910256765.4, Notification for Patent Registration Formalities, dated Sep. 5, 2022.
China Patent Application No. 201910256765.4, Notification on the Grant of Patent Right for Invention, dated Sep. 5, 2022.
Russia Patent Application No. 2019109655, Office Action and Search Report, dated Nov. 26, 2021, 20 pages.
Mexico Patent Application No. MX/a/2019/003737, Office Action, dated Nov. 3, 2022.
Brazil Patent Application No. 1020190066024, Office Action, dated Dec. 27, 2022, 9 pages.
Vietnam Patent Application No. 1201901651, Notice of Allowance, dated Jan. 5, 2023, 2 pages.
Japan Patent Application No. 2019062754, Office Action, dated Jan. 10, 2023, 4 pages.
India Patent Application No. 201944013200, Office Action, dated Mar. 29, 2022.
Vietnam Patent Application No. 1-2019-01651, Office Action, dated Mar. 29, 2022.
Russia Patent Application No. 2019109655, Decision to Grant, dated Apr. 15, 2022.
China Patent Application No. 201910256765.4, Office Action, dated Apr. 27, 2022.
Japan Patent Application No. 2019-062754, Office Action, dated May 31, 2022.
Europe Patent Application No. 19166479.6, Office Action (Communication Pursuant to Article 94(3) EPC), dated Jun. 30, 2022.

* cited by examiner

DISPERSER PLATES WITH INTERMESHING TEETH AND OUTER REFINING SECTION

CROSS-REFERENCE TO RELATED APPLICATIONS

This application is a divisional application of U.S. application Ser. No. 16/362,070, entitled "Disperser Plates With Intermeshing Teeth and Outer Refining Zone," which claims the benefit under 35 U.S.C. § 119(e) of U.S. Provisional Application No. 62/651,777, entitled "Disperser Plates With Intermeshing Teeth and Outer Refining Zone," filed on Apr. 3, 2018, the disclosures of which are incorporated herein in their entireties by reference.

BACKGROUND OF THE INVENTION

1. Technical Field

This disclosure relates generally to dispersers for the paper and board industry, and more particularly to disperser segments used to impart work onto recycled fiber.

2. Related Art

When recycling paper fibers, industrial recycling mill operators use dispersers to break down and separate contaminants in the paper fibers. People familiar with this process typically call these contaminants "stickies." Stickies typically include glue, plastics, ink, and other such materials interspersed with the fibers being recycled. Operators can remove separated stickies from the fiber stock via screening, cleaning, and/or flotation processes. Any remaining particles can be broken down to such an extent that the stickies are not visible in the final product. The dispersion and separation processes allow operators to feed cleaner recycled paper fibers into paper machines. This practice causes fewer issues with the contaminants binding to paper machine fabrics and generally improves performance as a result. Additionally, dispersion of inks greatly improves the final product's visual appearance.

Operators typically disperse secondary fibers such as old corrugated cardboard ("OCC"), old newsprint ("ONP"), mixed office waste ("MOW"), magazines, commercial papers, etc. Dispersers usually comprise a rotating disc (a "rotor") facing a non-rotating disc (a "stator"). Each disc comprises disc segments and each disc segment typically has teeth. The teeth typical take the shape of a geometric prism, such as a square, trapezoidal, or pyramidal prism. The teeth protrude from one side of the disc segment in rows or bands. The rows of teeth on one disc intermesh with rows of teeth on the facing disc. That is, the rows of teeth on the facing disc segment are disposed at different radii from each other such that a row of teeth of one plate segment sits between rows of teeth of the facing plate segment when mounted in a disperser, thereby permitting the rows of teeth on the rotor to move around the center of rotation without hitting the teeth on the facing plate segment. The intermeshing teeth further allow a tooth on a first plate segment to extend between teeth in adjacent rows on the opposing, second plate segment. This intermeshing creates a circuitous gap between the opposing dispersing sections.

Typical facing disperser plates have gap or clearance between the rotor and stator teeth side walls that is between about 1 millimeter ("mm") and 5 mm. This spacing permits the teeth to flex and shear the fibers severely without creating significant amounts of fiber cutting. This flexing dislodges some of the dirt, ink, and other stickies. The spacing between the rotating and stationary disperser plates may be adjusted by a mechanism that moves the stator plates toward the rotor plates (or the rotor toward stator plates) while the rotor spins. The rotor remains centered and has freedom to move along its rotational axis.

As the rotor element rotates, the rotor element propels a feed stream of recycled paper fibers entering the disperser from the center of the stator disc. A center hubcap (also known as a "flinger") directs the feed stream into the gap between the two facing disperser discs. The feed stream then travels radially outward from the center of rotation across the bands of intermeshing teeth toward the outlet of the machine via the periphery of the discs. The outlet is often a hole at the bottom of the machine through which the dispersed pulp falls into a chest for dilution and further processing. Some dispersers have steam added to the feed side. In addition to aiding the transportation of the recycled fiber across the intermeshing bands of teeth, the supplemental steam also allows the dispersed recycled fiber to exit the disperser via a pressurized steam pipe.

Although the disperser's primary function is to separate and disperse, one of the side effects of the equipment is that some of the energy applied results in fiber development i.e. "refining." To appreciate the difference between "dispersion" and "refining," it is useful to understand the physical characteristics of the recycled paper fibers: recycled paper fibers are generally tube-like structures comprising a number of concentric layers called "lamellae." Each lamella comprises finer structural components called "fibrils" that are bound to one another to form the lamella. Whereas dispersion flexes the entire tube-like fiber itself, "refining" subjects the fibers to significantly more frictional and compression energy. As a result, refining delaminates the fibers and frays the fibrils that comprise the lamellae, thereby increasing the surface area of the fibers. In some cases, this refining is unwanted because it reduces the ability of the pulp suspension to dewater, but in other cases, refining is desirable. For example, increasing the surface area of the fibers greatly increases the tensile strength of papers or other products manufactured from the refined fibers. To produce a pulp of a desired grade that has desired strength qualities, operators may want to control the level of refining that the recycled pulp fibers undergo. Recycling operations may use low consistency refiners after the disperser in order to provide this additional refining.

Prior attempts at combining elements of dispersion and refining achieved much greater refining than dispersion alone. The plate segment described in US. patent application Ser. No. 14/082,424, for example, did not have intermeshing teeth and used refining principles and a wider operating gap to impart a very slight dispersing effect. The resulting effect was a large amount of refining with a smaller amount of dispersion.

Prior refiner plate segments with intermeshing pins were designed primarily for refining and not for dispersion. For example, the refiner plate design disclosed in U.S. Pat. No. 7,354,011 had flow restrictors interspersed with refining bars throughout the plate segment. Int'l App. No. PCT/SE9802124, disclosed pins and flow restrictors disposed in an inner chip separation section and refining bars in an outer refining section. However, in both of these designs, the cylindrical pins were included primarily as a way to break down the wood chip pieces prior to the wood chip pieces entering the refining section. It was thought that the pins would break down the wood chip pieces more uniformly and help distribute the broken down wood chips more evenly into the refining gap, thus mitigating load swings between the refining plate segments while also starting the refining (i.e. the defibration) process.

SUMMARY OF THE INVENTION

Applicant has discovered that there is potential to use dispersers to disperse and refine fibers to a desired quality while giving operators greater control over the amount of refining the fibers undergo in a single pass through an exemplary disperser comprising an exemplary disperser-refiner plate segment. The problem of having wasted time and energy resulting from the use of separate dispersion and refining apparatuses to produce recycled fibers of desired tensile strength is solved by adding a bar and groove refining section after (i.e. radially outward) of the intermeshing disperser teeth on a disperser plate segment, wherein the disperser teeth are taller than the refining bars relative to the back side of the exemplary disperser-refiner plate segment, and wherein the disperser teeth have sharp leading edges at the junction of sidewalls.

In certain exemplary embodiments, it may be desirable to have a thicker substrate under the refining section of bars and grooves relative to the substrate under the dispersion section, which comprises teeth in the shape of a polygonal prism. In other exemplary embodiments, there may be no substantial difference in substrate thickness of the refining section relative to the dispersion section, but in such embodiments, the teeth are generally taller than the refining bars in the refining section. For example, the teeth may be 50 percent ("%") taller than the refining bars. In other examples, the teeth may be at least 100% (i.e. double) the height of the refining bars.

Applicant has found that intermeshing tooth designs of various geometries have the ability to apply energy levels of 20 kilowatt hour per ton ("kWh/T") to 60 kWh/T generally, with some designs reaching 100 kWh/T levels and slightly above. Refining bar and groove designs have a much greater ability to apply energy because the gap between facing bar and groove regions can be controlled effectively to low values, such as a fraction of a millimeter. This results in load-ability of traditional refiner plates being multiple times higher than intermeshing tooth designs.

Traditional bar and groove refiner plate segments have been used in the past in dispersers (i.e. the disperser machine) in lieu of disperser plates with some success, but such refiner plate segments normally have a lower dispersion efficiency and often will have limited throughput capacity. Using a refiner plate segment in a disperser is therefore discouraged. On the other hand. Applicant has found that intermeshing tooth patterns have high volumetric capacity and dispersion efficiency, but these intermeshing tooth patterns provide less refining as a proportion of energy applied. The intermeshing tooth patterns lack the ability to apply substantial energy and therefore lack the ability to provide an increased refining effect.

Applicant has discovered that it is therefore desirable to maintain a reasonably consistent load in the dispersion section to capitalize on the high volumetric capacity and dispersion efficiency, while also allowing operators to have a further range of control over the operating gap between refining sections of opposing plate segments. The width of the operating gap affects the load of fibers pushing against the respective refining sections. Unlike the opposing dispersion sections, the opposing refining sections do not intermesh. That is, the gap between the opposing refining sections is linear when viewed from the side.

Without being bound by theory, a majority of the refining occurs in the fiber pad that accumulates in the gap between the opposing refining sections. The shear and compressive forces—particularly the compressive forces—of adjacent fibers moving past each other rapidly is thought to develop the fibers (i.e. to fray the fibrils that comprise the lamellae of the recycled paper fibers). The successively crossing bars and grooves of the opposing refining sections impart much of the shear and compressive forces into the fiber pad. For example, when two opposing bars cross each other, a fiber caught between these opposing bars can be thought to experience a higher load than when the opposing bars move past each other and two opposing grooves temporarily align. The average load is a function of the width of the refining gap. In the aggregate, by adjusting the width of the gap between the opposing refining sections, operators can adjust the load of the fiber pad between the opposing refining sections, and thereby adjust the intensity and efficiency with which the fiber is refined.

A disperser-refiner plate segment in accordance with the present disclosure includes an intermeshing section of concentric teeth, which is followed by a refining section using bars and grooves (i.e. the refining section is disposed radially outward of the intermeshing section of concentric teeth (i.e. the dispersion section)). In exemplary disperser-refiner plate segment designs, the gap between the intermeshing teeth of opposite discs may adjust by 0.1 mm to 0.4 mm for each millimeter of machine adjustment, whereas a bar and groove refining section will have a 1:1 gap adjustment with position change. That is, the design is conceived in such a way that the intermeshing section and the refining section will both be adjusted as the gap is controlled, but the effect on the refining section will be more pronounced. This difference may allow for a relatively unchanged dispersion effect while permitting greater control over the refining effect. As a result, when an operator adjusts the position of the plate assemblies relative to each other and thereby adjusts the operating gap between the exemplary disperser-refiner plate segments described herein, the operator can more precisely control the intensity of the refining energy being applied in the refining gap while also maintaining a fairly consistent dispersion energy applied to the fiber in the dispersion gap.

Consequently, the use of exemplary disperser-refiner plates with intermeshing teeth and an outer refining section may allow mill operators to improve dispersion efficiency, while also adding refining energy to the operator's pulp without using additional refining equipment or increasing the maximum amount of refining preformed on the fiber.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

DETAILED DESCRIPTION OF THE INVENTION

Figure 1A:
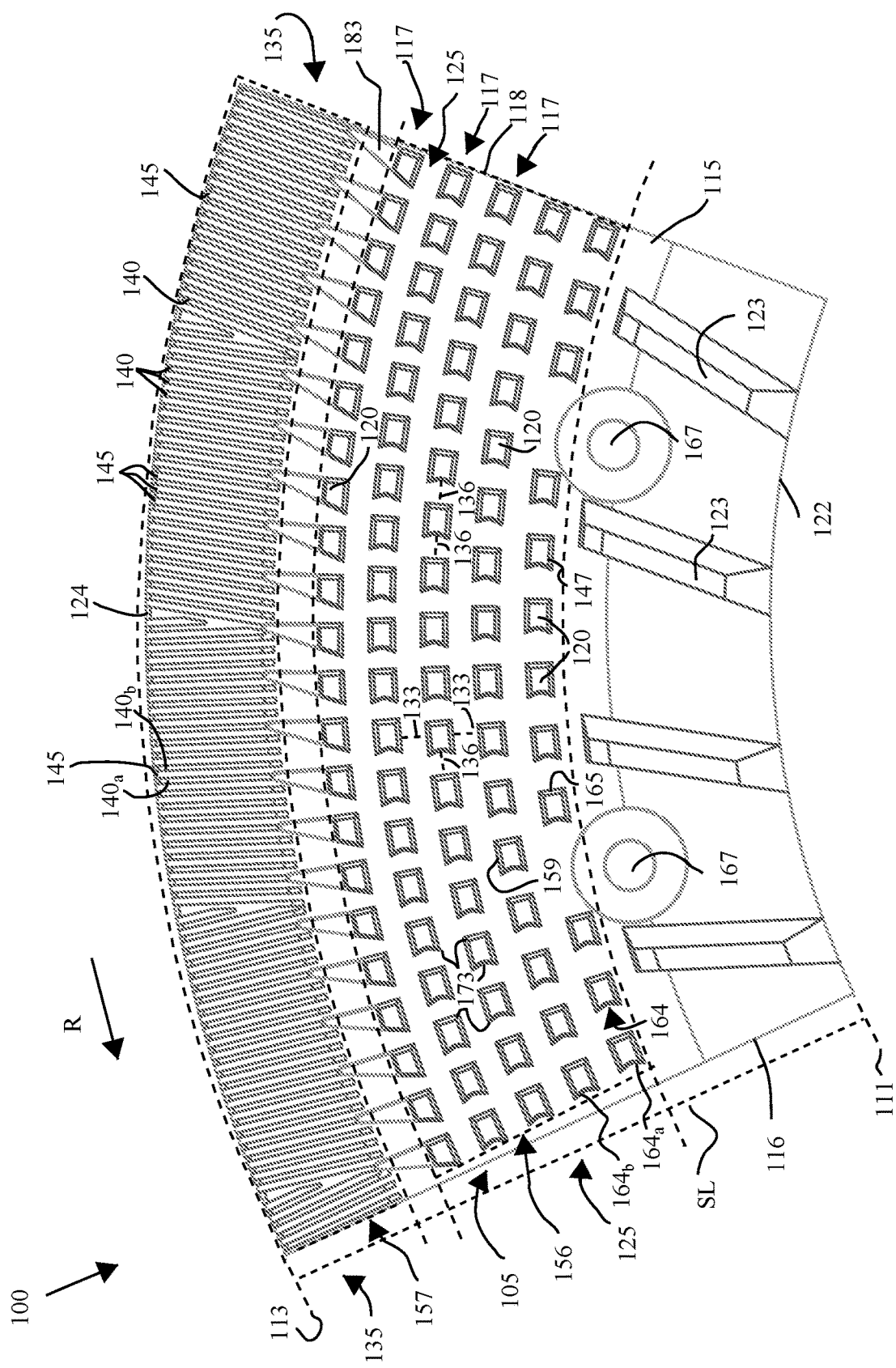
FIG. 1A is a view of the front side of an exemplary rotor disperser-refiner plate segment comprising a refining section disposed radially outward from a dispersion section. The teeth of the dispersion section are taller than the bars in the refining section.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

FIG. 1A depicts an exemplary disperser-refiner plate segment 100. In the depicted embodiment, the exemplary disperser-refiner plate segment 100 is a rotor segment. The disperser-refiner plate segment 100 comprises a substrate 115 having a front side 105 distally disposed from a back side (210, FIG. 2). The substrate 115 generally defines an annular sector bounded by an inner arc 122, outer arc 124, and lateral sides 116, 118. The inner arc 122 disposed at a first end 111 of a side length SL and an outer arc 124 located at a second end 113 of the side length SL, thereby placing the outer arc 124 at a radially distant location from the inner arc 122. A first lateral side 116 extends between the inner arc 122 and the outer arc 124. A second lateral side 118 is distally disposed from the first lateral side 116 along the distances of the outer arc 124 and the inner arc 122.

Fastener holes 167 extend through the substrate 115. Operators insert bolts or other fasteners (not depicted) to engage the disperser-refiner plate segment 100 to a backing structure of a disperser assembly. Once installed, a series of successively adjacent disperser-refiner plate segments 100 form an annulus configured to rotate around a center of rotation. The depicted disperser-refiner plate segment 100 is optimized to rotate in a counter-clockwise direction R.

A series of raised teeth 120 extend from the substrate 115. The series of raised teeth 120 generally have the shape of a polyhedron (i.e. a geometric prism). For example, the shape may be a cube, an elongated rectangular prism, a trapezoidal prism, a triangular prism, a pyramid, a truncated pyramid (i.e. a pyramid terminating in a plateau, rather than a point), a pentagonal prism, or other polyhedron. Each tooth 120 may have inner walls 147 and outer walls 159 relative to the inner arc 122 of the disperser-refiner plate segment 100. The trailing wall 165 of each tooth 120 is distally disposed from the leading side 164. When the disperser-refiner plate rotates, the leading side 164 is the side of the tooth 120 that would encounter a fixed point in the tooth's rotational path before the trailing wall 165. The leading side 164 of the teeth may be multi-faceted (i.e. comprising multiple leading walls $164_a$, $164_b$, etc.) and may preferably have a flat or concave shape comprising sharp edges 173 at the junctions of adjacent walls (see 147, 159, 165, $164_a$, $164_b$). It is believed that the concave shape of the leading side 164 may retain recycled fiber 275 (FIG. 2A) in the dispersion section 125 for a longer time on average than teeth lacking such a concave shape on the leading side 164. Furthermore, the sharp edges 173 formed at the junction of adjacent walls 147, 159, $164_a$, $164_b$ may provide more shear force to recycled fibers 275 that spend a greater average time in the dispersion section 125. As a result, the exemplary disperser-refiner plate segments 100 dislodge ink and other stickies from the recycled fiber 275 with enhanced effectiveness. The teeth 120 are arranged in rows 117 disposed at radial intervals 133. Lateral intervals 136 also separate each tooth 120.

Figure 1B:
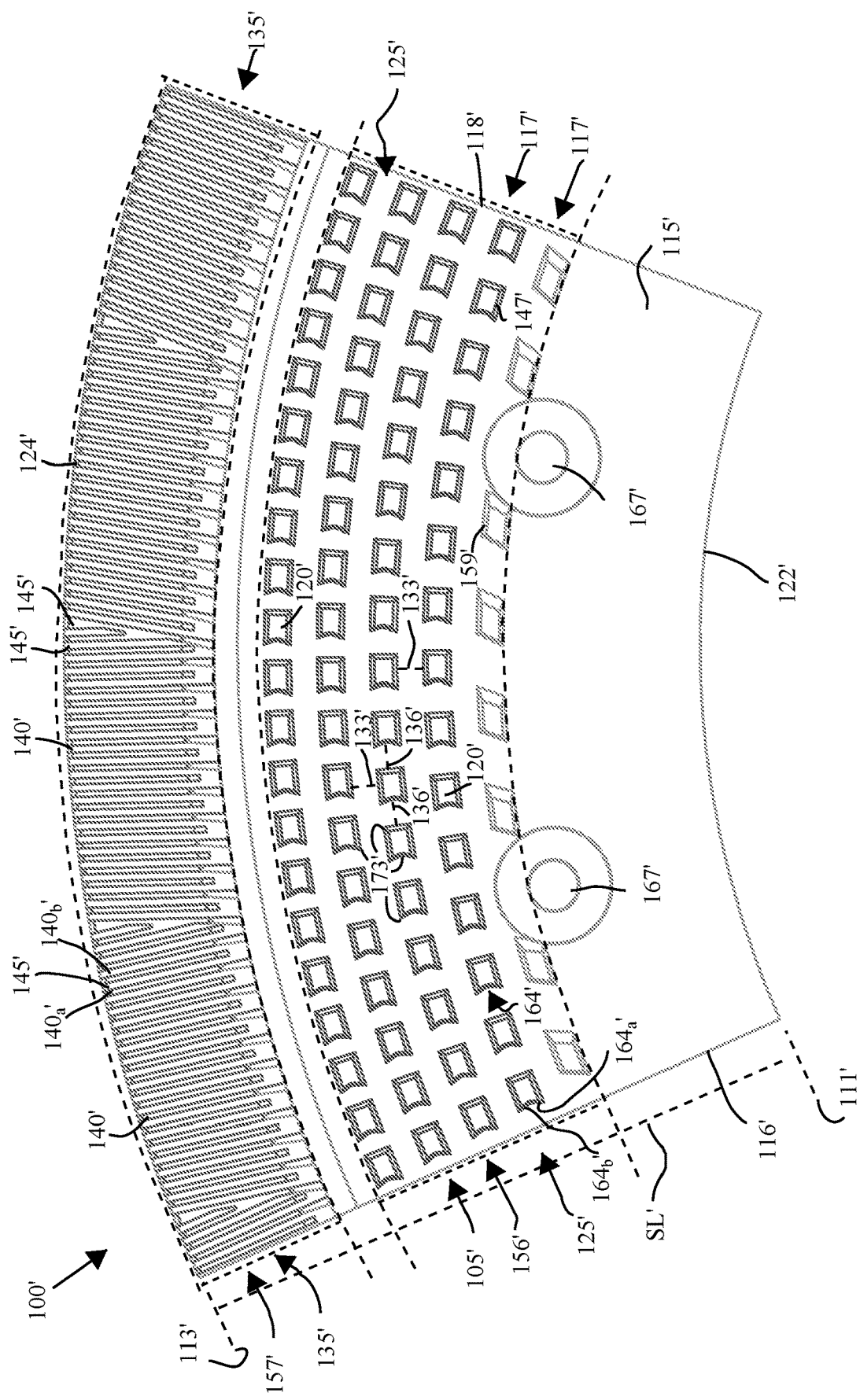
FIG. 1B is a view of the front side of an exemplary stator disperser-refiner plate segment comprising a refining section disposed radially outward from a dispersion section. The teeth of the dispersion section are taller than the bars in the refining section.

The area 156 encompassing the teeth 120 on the substrate 115 defines a dispersion section 125. Each tooth 120 in the series of teeth 120 have a tooth height (230, FIG. 2A). Teeth 120' on the facing disperser-refiner plate segment 100' (FIG. 1B) are likewise disposed in the dispersion section 125' at radial intervals 133'. However, the teeth 120' on the facing disperser-refiner plate segment 100' are radially offset from the teeth 120 depicted in FIG. 1A. That is, the teeth 120' on the facing disperser-refiner plate segment 100' and are disposed between the teeth 120 depicted in FIG. 1A when the disperser-refiner plate segments 100, 100' face each other. Stated another way, the teeth 120 of a first disperser-refiner plate segment 100 (FIG. 1A) are disposed in the radial intervals 133' between adjacent rows 117' of teeth 120' on the opposing disperser-refiner plate segment 100' (FIG. 1B). In this manner, the teeth 120, 120' are configured to intermesh when installed on a disperser (see FIG. 2A). It will be understood that the number of intermeshing rows 117 of teeth 120, 120' and design of the teeth 120, 120' will vary depending on how much dispersion energy is desired; however, exemplary disperser-refiner plate segments 100, 100' disclosed herein have a minimum of two rows 117 of teeth 120, 120' on each disperser-refiner plate segment 100, 100'. At least four rows 117 of teeth 120, 120' is usually preferable. The rows 117 of teeth 120 may be limited by the diameter of the disperser. In some exemplary embodiments, four to eight rows 117 of teeth 120, 120' may be desirable.

A series of refiner bars 140 extend from the substrate 115 on the front side 105 at a location radially distant from the teeth 120. Adjacent refiner bars (see e.g. $140_a$ and $140_b$) and the substrate 115 define a groove 145 between the adjacent refiner bars (e.g. $140_a$ and $140_b$). A groove 145 is disposed between every adjacent refiner bar (e.g. $140_a$ and $140_b$), therefore the series of refiner bars 140 creates a series of alternating refiner bars 140 and grooves 145. The area 157 that the series of refiner bars 140 and grooves 145 occupies on the front side 105 is known as the "refining section" 135. The refining section 135 is disposed closer to the second end 113 of the side length SL than the dispersion section 125. The refiner bars 140 have a refiner bar height (250, FIG. 2). The tooth height 230 exceeds the refiner bar height 250. The outer refining section 135 may have a minimum length of 10 mm. In other exemplary embodiments, the outer refining section 135 may preferably be between about 25 mm and 100 mm in length. The geometry of each section (e.g. the dispersion section 125, the refining section 135, and other potential sections on the disperser-refiner plate segment 100 such as a feeding bar section) is limited in part by the size of the disperser-refiner plate segments 100, 100', which are fixed for a given disperser equipment model.

In certain exemplary embodiments, the area 157 of the refining section 135 is in a range of 20% to 33⅓% of the surface area of the substrate 115 on the front side 105 of the disperser-refiner plate segment 100. For example, the area 157 of the refining section 135 may be at least 20%, 25%, or 33⅓% of the surface area of the substrate 115 on the front side 105 of the disperser-refiner plate segment 100.

The loadability of the dispersion section 125 is generally more limited than the loadability of the refining section 135. In general, the total volume of the dispersion area between two opposing plates 100, 100' (i.e. the volume of the dispersion gap 251 (FIG. 2A) plus the total volume of the lateral intervals 136) is generally greater than in a comparable total volume of a refining area (i.e. the volume of the refining gap 249 (FIG. 2A) and the grooves 145) between opposing plates 100, 100'. Without being bound by theory, it is thought that if the volume of the recycled fiber 275 and the feed rate is constant, then the section with the smaller total volume will experience the greater load (i.e. force). One way to increase the effectiveness of a dispersion section 125 is to increase the area of the dispersion section 125 on a segment. Given the high loadability of the refining section 135, it is thought that the refining section 135 can cede ground to the radially inward dispersion section 125 without sacrificing refining effectiveness.

In certain exemplary embodiments, the area 156 of the dispersion section 125 is in a range of 40% to 50% of the surface area of the substrate 115 on the front side 105 of the disperser-refiner plate segment 100. In certain exemplary embodiments, the dispersion section 125 may occupy at least 40% of the surface area of the substrate 115 on the front side 105 of the disperser-refiner plate segment 100. For example, in certain exemplary embodiments, the refining section 135 occupies about 30% of the surface area of the substrate 115 on the front side 105 of the disperser-refiner segment 100, while the dispersion section 125 occupies about 70% of the surface area of the substrate 115 on the front side 105 of the disperser-refiner segment 100. In still other exemplary embodiments, the refining section 135 may occupy about 30% of the surface area of the substrate 115, the dispersion section 125 may occupy about 40% of the surface area of the substrate 115, and a feeding section (comprising a plurality of inner feeding bars 123) may occupy about 30% of the surface area of the substrate 115, each on the front side 105 of the disperser-refiner plate segment 100. In other exemplary embodiments, the dispersion section 125 occupies at least 50% of the surface area of the substrate 115.

FIG. 1A further depicts a series of transition bars 183 disposed between the radially outermost teeth 120 to a refiner bar 140 at the inlet to the refining section 135. The transition bar 183 may physically connect the radially outermost tooth 120 to a refiner bar 140, or the transition bars 183 may merely be disposed adjacent to a radially outermost tooth 120 and a refiner bar 140. The transition bar 183 feeds the recycled fiber 275 into the refining gap 249. In certain exemplary embodiments, the transition bars 183 may have a wider radially inward end compared to a narrower radially outward end. It will be further understood that in certain exemplary embodiments, the radially outward end of the transition bar 183 may abut a refiner groove 145. In certain exemplary embodiments, the radially inward end of the transition bar 183 may be disposed in or radially outward from a lateral interval 136 between the radially outermost teeth 120.

Without being bound by theory, it is though that the transition bars 183 can help feed the recycled fiber 275 into the refining section 235 and thereby prevent stalling and buildup of recycled fiber 275 between the dispersion section 225 and the refining section 235.

The disperser-refiner plate segment 100 may feature inner feeding bars 123. However, it will be understood that these inner feeding bars 123 may not be present on every disperser-refiner plate segment 100, 100'.

FIG. 1B shows an exemplary opposing disperser-refiner plate segment 100' configured to face the rotor disperser-refiner plate segment 100 of FIG. 1A in a disperser. In this example, the opposing disperser-refiner plate segment 100' is a stator. It will be understood that in counter-rotating dispersers, the opposing disperser-refiner plate segment 100' will be another rotor segment (see FIG. 1A). The teeth 120' are configured to intermesh with the teeth 120 shown in FIG. 1A. Applicant uses the prime (') symbol to indicate that the particular feature is depicted on the opposing disperser-refiner plate segment, which is a stator plate segment 100' in the depicted embodiment. Similar reference signs indicate similar features on the opposing disperser-refiner plate segments 100, 100'.

Figure 2A:
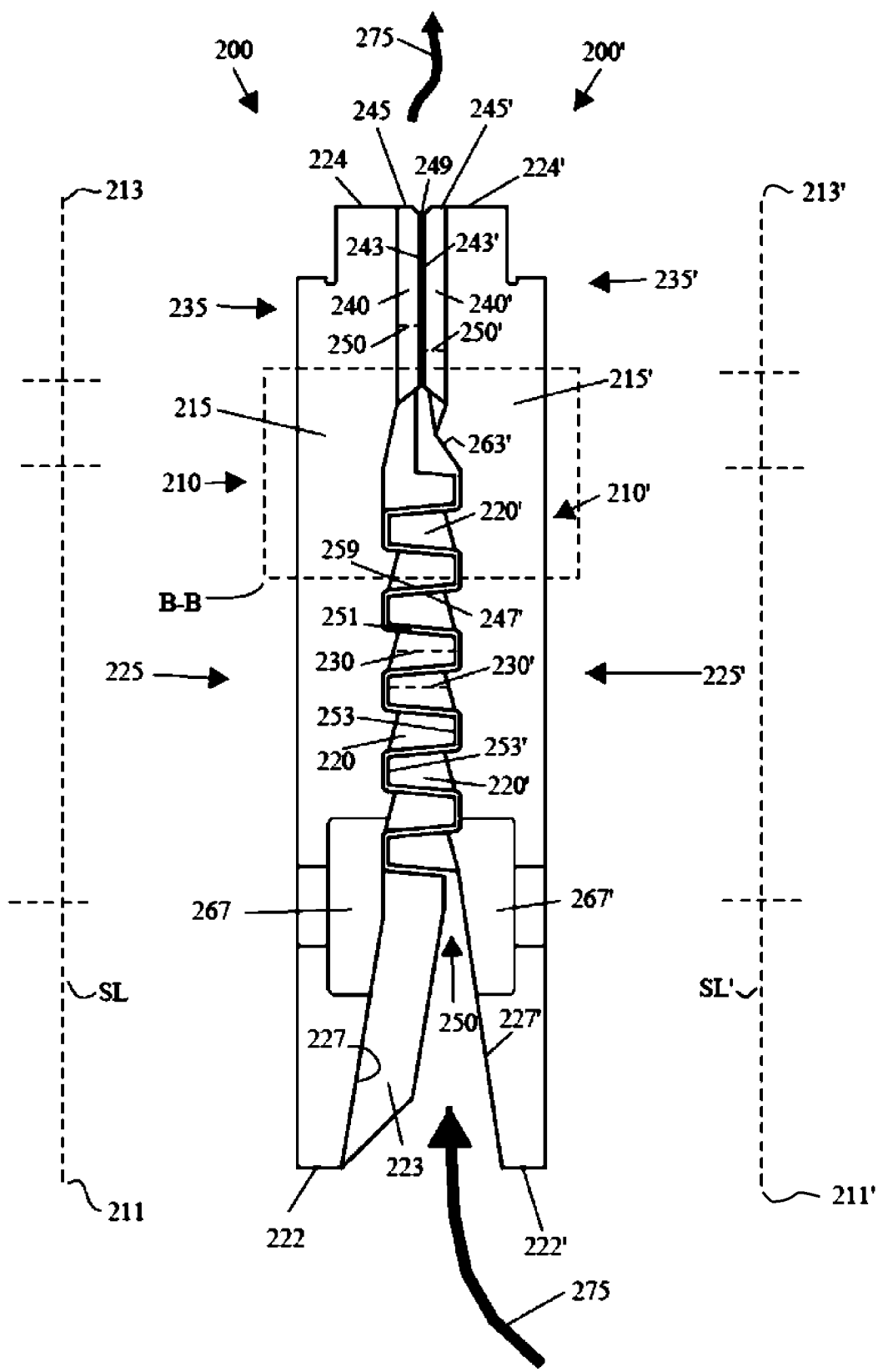
FIG. 2A is a cross-sectional side view of the rotor and stator disperser-refiner plate segments of FIGS. 1A and 1B, wherein the rotor and stator disperser-refiner plate segments face each other as they would installed on a disperser.

FIG. 2A is a cross-sectional view of exemplary facing disperser-refiner plate segments 200, 200' showing tooth height 230 exceeding the refiner bar height 250. In operation, recycled fiber 275 flows radially outward from a center of rotation and crosses the inner arcs 222, 222' of the facing disperser-refiner plate segments 200, 200'. The recycled fibers 275 then continue to flow radially outward through the dispersion sections 225, 225' and a dispersion gap 251 defined by the facing dispersion sections 225, 225'.

Ramps 227, 227' may be desirably placed radially inward of the teeth 120, 120'. The ramps 227, 227' prevent recycled fiber 275 from by-passing the dispersing effect at the largest expected dispersion gap 251 depicted at the inlet of the dispersion sections 225, 225'. If present, inner feeding bars 223 help break down the recycled fiber 275 and direct the recycled fiber 275 into the dispersion sections 225, 225'.

The recycled fiber 275 is treated in the intersection of the lateral inner walls 247 and lateral outer walls 259 of the intermeshing teeth 220, 220' in overlapping the dispersion sections 225, 225'. Without being bound by theory, it is believed that compression provides much of the refining force in the refining section 235 whereas shear forces comprise much of the dispersing forces in the dispersion section 225. This is due in part to the comparatively larger dispersion gap 251 relative to the refining gap 249. It is believed that these shear forces dislodge much of the stickies from the recycled fiber 275. It is believed that the multiple sharp edges 173 on the dispersion teeth 120, particularly on the leading side 164, impart much of these shear forces and thereby improve the dispersion effect. That is, the rapid flexing of the recycled fibers 275 between the lateral inner walls 247 and lateral outer walls 259 and along the edges 173 dislodge the dirt, ink, and stickies from the recycled fiber 275. The rapid movement and shear of the dirt, ink, and stickies between the lateral inner walls 247 and lateral outer walls 259 also breaks the dirt, ink, and stickies down to the extent that they will not be visible in a final product.

After dispersion, the radially outermost rows 217 of intermeshing teeth 220, 220' then further feed dispersed recycled fiber 275 into a refining gap 249 defined by the flat top surfaces 243, 243' of the opposing refiner bars 240, 240'. As seen in FIG. 2A, a large space exists after the lateral outer wall 259 of the radially outermost tooth 220. This space allows manufacturers to grind the tops of refining bars 240 to a level below the tops of the dispersing teeth 120, without damaging the teeth 120 in doing so. However, this space also allows recycled fibers 275 to accumulate and stall between the dispersion section 225 and the refining section 235. Therefore, in a preferred embodiment, the substrate 215' of the stator disperser-refiner plate segment 200' further defines a deflector 263' disposed between the dispersion section 225' and the refining section 235'. The deflector 263' directs the dispersed recycled fiber 275 into the refining cap 249 and thereby prevents stalling. It will be understood that in other exemplary embodiments, the deflector 263' may be disposed on the rotor disperser-refiner plate segments 200. As depicted, the deflector 263' may have a transitional thickness (i.e. connecting a thinner section of the substrate under the dispersion section 225 to a thicker section of the substrate under the refining section 235).

In still other exemplary embodiments, the deflector 263' may be omitted. However, it will be understood that the feeding of the recycled fiber 275 into the refining sections 235, 235' will be less efficient without the deflector 263' and the maximum recycled fiber 275 throughput may be reduced. The opposing refining sections 235, 235' may feature any existing or new configuration of refiner bars 240, 240' and grooves 245, 245' that have a flat top surface 243, 243', and treat the recycled fiber 275 in the refining gap 249.

Without being bound by theory, it is believed that the inner portion of the disperser-refiner plate segments 200, 200' featuring the intermeshing teeth 220, 220' (which has more volumetric restriction to flow) helps to keep high production capacity and provide effective dispersion work. The dispersion sections 225, 225' feed the refiner bar 240, 240' and groove 245, 245' refining sections 235, 235' in an outer peripheral position of the disperser-refiner plate segments 200, 200'. The refining sections 325, 355' have more feeding/loading capacity and higher volume (due to the larger area of the arc segment at nearer the outer periphery) to better handle the production and apply the efficient refining energy.

The exemplary disperser-refiner plate segments 200, 200' may be cast and then machined to have at least two different surface levels T1, T2 relative to the back side 210, to provide efficient dispersion in addition to refining energy. The intermeshing teeth 220, 220' will be higher 230, 230' than the bars refiner 240, 240' (see 250, 250') and grooves 245, 245'. As a result, the tops 243, 243' of refiner bars 240, 240' can be machined precisely without lowering the height 230, 230' of the intermeshing teeth 220, 220'. The intermeshing teeth 220, 220 can be as cast, machined flat, or both cast and machined flat. In certain exemplary embodiments, a tooth 220 of the intermeshing teeth 220 is at least 50% taller than a refining bar 240 in the refining section 235. For example, a refiner bar 240 may be about 7 mm tall ±3 mm, and the dispersion tooth 220 may be at least 50% taller than the refiner bar 240. It is contemplated that the intermeshing teeth 220 described herein may have a height in the range of about 8 mm to about 30 mm. In still other exemplary embodiments, the intermeshing teeth 220 may be at least 100% taller than a refiner bar 240.

Figure 2B:
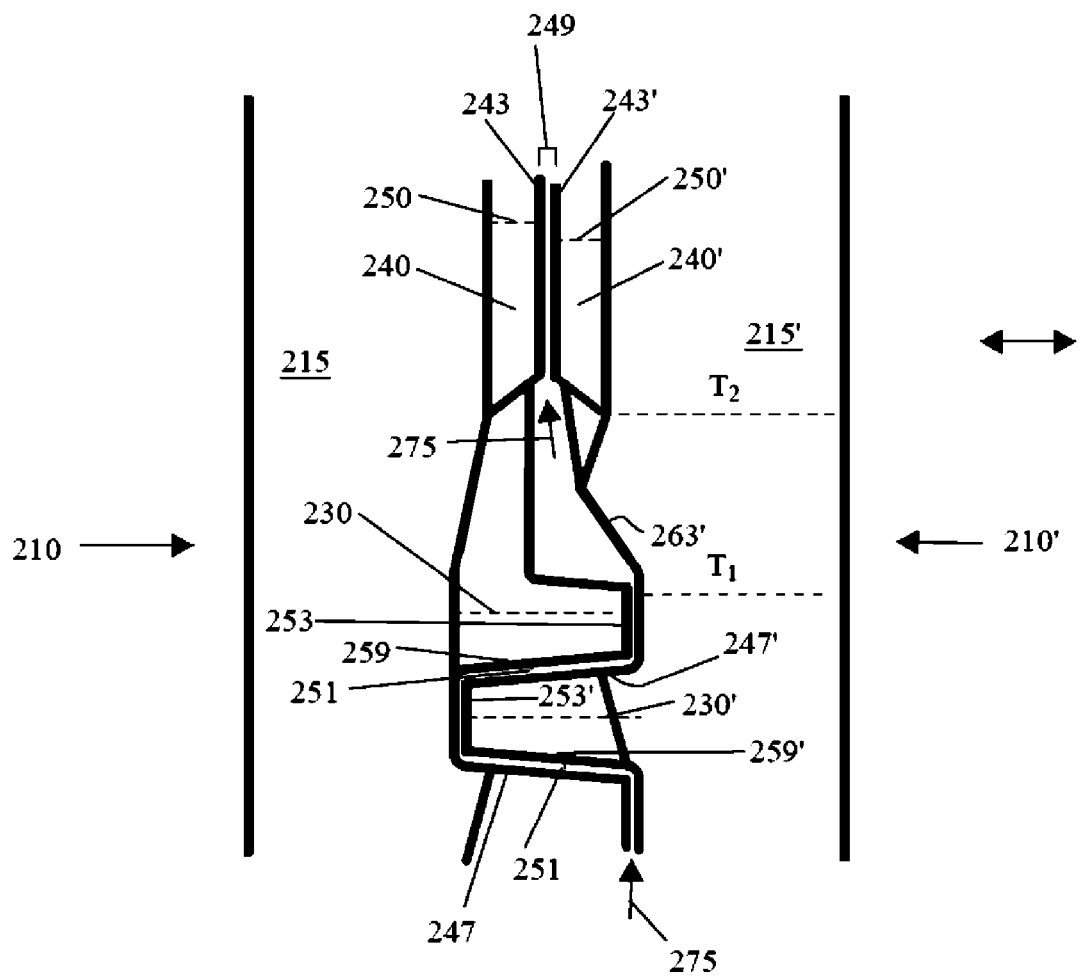
FIG. 2B is a close up of section B-B of FIG. 2A, further detailing the dispersion gap and the refining gap.

FIG. 2B is a close up view of box B-B depicted in FIG. 2A. The exemplary embodiments are conceived in such a way that the dispersion gap 251 and the refining gap 249 will both be adjusted when operators adjust the distance between the opposing disperser-refiner plate segments 200, 200', however, the effect on the refining gap 249 will be more pronounced than the dispersion gap 251. Without being bound by theory, it is believed that dispersion occurs primarily at the intersection of the lateral inner walls 247 and lateral outer walls 259 of the intermeshing teeth 220, 220' and not across the tops 253, 253' of the intermeshing teeth 220, 220'. As a result, when an operator moves a disperser-refiner plate segment 200 toward or away from the other disperser-refiner plate segment 200', the distance of the dispersion gap 251 between the lateral inner walls 247 and the lateral outer walls 259 changes less than the distance between the opposing tops 243, 243' of the refiner bars 240, 240'.

For exemplary disperser-refiner plate segments 200, 200', the dispersion gap 251 between the intermeshing teeth 220, 220' of opposite disperser-refiner plate segments 200, 200' may adjust by 0.1 mm-0.4 mm for each millimeter of machine adjustment, whereas a refining gap 249 will have a 1:1 adjustment with position change. In some exemplary embodiments, it is contemplated that a second surface level T2, is disposed upon a thicker substrate (as measured as the shortest distance from the second surface level T2 to the back side 210) than a first surface level Ti. Without being bound by theory, the thicker substrate under the second surface level T2 in conjunction with the linear refining gap 249 between opposing disperser-refiner plate segments 200, 200' may allow for exemplary disperser-refiner plate segments 200, 200' to be configured to maintain a 1:1 refining gap adjustment ratio while further configuring an exemplary disperser-refiner plate segment 200, 200' to maintain an adjustment ratio of less than 1:1 for the dispersion gap 251. This difference will allow for a relatively unchanged dispersion effect while allowing operators to control the refining effect with greater precision. As a result, it now becomes possible, with the right selection of a disperser plate design, to have a fixed dispersion energy applied to the recycled fiber 275, while the machine position adjustment more significantly controls the refining energy applied.

In certain exemplary embodiments, the refining gap 249 is 3 mm or less. In still further exemplary embodiments, adjusting the axial position of the opposing disperser-refiner plate segments 200, 200' results in adjusting the refining gap 249 in a 1:1 ratio and the dispersion gap 251 in a 1:3 ratio. That is, for every change in width of the refining gap 249, the width of the dispersion gap 251 changes one third of the change in width of the refining gap 249.

An exemplary disperser-refiner plate segment comprises: a substrate separating a front side from a back side, the substrate having: the front side, a side length, an inner arc disposed at a first end of the side length, an outer arc disposed at a second end of the side length, the outer arc located radially distant from the inner arc along the side length, a first lateral side extending between the inner arc and the outer arc along the side length, a second lateral side extending between the inner arc and the outer arc along the side length, the second lateral side being distally disposed from the first lateral side, and the back side oppositely disposed from a front side along a thickness, the back side and the front side extending between the outer arc, the inner arc, the first lateral side, and the second lateral side; teeth extending from the substrate, wherein the teeth: are arranged in rows disposed at radial intervals, and occupy an area on the substrate, wherein a tooth in the teeth comprises: a tooth height, walls, and edges at junctions of adjacent walls, and wherein the area defines a dispersion section; and refiner bars extending from the substrate, wherein adjacent refiner bars and the substrate define a groove between the adjacent refiner bars, wherein the refiner bars thereby define a refining section of alternating refiner bars and grooves, wherein the refining section is disposed closer to the second end of the side length than the dispersion section, wherein refiner bars in the area of alternating refiner bars and grooves have a refiner bar height, and wherein the tooth height exceeds the refiner bar height.

Another exemplary disperser-refiner plate segment comprises: a substrate; teeth extending from the substrate, wherein the teeth are arranged in rows disposed at radial intervals, wherein a tooth of the teeth has a tooth height, walls, and edges at junctions of adjacent walls, wherein the teeth occupy an area on the substrate, and wherein the area defines a dispersion section; and refiner bars extending from the substrate, wherein adjacent refiner bars and the substrate define a groove between the adjacent refiner bars, wherein the refiner bars thereby define a refining section of alternating refiner bars and grooves, wherein the refining section is distally disposed from the dispersion section, wherein the refiner bars have a refiner bar height, and wherein the tooth height exceeds the refiner bar height.

An exemplary disperser apparatus comprises: a first disperser assembly having a center of rotation at an axis and being configured to rotate around the axis; and a second disperser assembly facing the first disperser assembly, wherein the first disperser assembly and the second disperser assembly each comprise: a backing structure and a plurality of disperser-refiner plate segments annularly arranged and fixedly engaged to the backing structure, the disperser-refiner plate segments having: a substrate comprising: a front side, a side length, an inner arc disposed at a first end of the side length, an outer arc disposed at a second end of the side length, the outer arc located radially distant from the inner arc along the side length, a first lateral side extending between the inner arc and the outer arc along the side length, a second lateral side extending between the inner arc and the outer arc along the side length, the second lateral side being distally disposed from the first lateral side, and a back side oppositely disposed from a front side along a thickness, the back side and the front side extending between the outer arc, inner arc, first lateral side, and second lateral side, wherein the back side is disposed on the backing structure, wherein the front side further comprises: teeth extending from the substrate, wherein the teeth are arranged in rows disposed at radial intervals, wherein teeth in the teeth have a tooth height, walls, and edges at junctions of adjacent walls, wherein the teeth occupy an area on the substrate, and wherein the area defines a dispersion section; and refiner bars extending from the substrate, wherein adjacent refiner bars in the refiner bars and the substrate define a groove between the adjacent refiner bars, wherein the refiner bars thereby define a refining section of alternating refiner bars and grooves, wherein the refining section is disposed closer to the second end of the side length than the dispersion section, wherein refiner bars in the area of alternating refiner bars and grooves have a refiner bar height, and wherein the tooth height exceeds the refiner bar height, wherein opposing teeth on the first disperser assembly relative to the second disperser assembly intermesh to define a dispersion gap, and wherein opposing bars on the first disperser assembly relative to the second disperser assembly define a refining gap.

While the invention has been described in connection with what is presently considered the most practical and preferred embodiment, it is to be understood that the invention is not to be limited to the disclosed embodiment, but on the contrary, is intended to cover various modifications and equivalent arrangements included within the spirit and scope of the invention.

What is claimed is:

1. A disperser apparatus comprising:
a first disperser assembly having a center of rotation at an axis and being configured to rotate around the axis; and
a second disperser assembly facing the first disperser assembly,
wherein the first disperser assembly and the second disperser assembly each comprise:
a backing structure; and
a plurality of disperser-refiner plate segments annularly arranged and fixedly engaged to the backing structure,
wherein each of the disperser-refiner plate segments includes a substrate separating a front side from a back side, the substrate comprising:
the front side;
a side length;
an inner arc disposed at a first end of the side length;
an outer arc disposed at a second end of the side length, the outer arc located radially distant from the inner arc along the side length;
a first lateral side extending between the inner arc and the outer arc along the side length;
a second lateral side extending between the inner arc and the outer arc along the side length, the second lateral side being distally disposed from the first lateral side;
the back side oppositely disposed from the front side along a thickness, the back side and the front side extending between the outer arc, the inner arc, the first lateral side, and the second lateral side;
teeth extending from the substrate, wherein the teeth are arranged in rows disposed at radial intervals, and occupy an area on the substrate wherein each tooth in the teeth comprises:
a tooth height; and
walls; and
edges at junctions of adjacent walls,
wherein the area defines a dispersion section;
refiner bars extending from the substrate, wherein adjacent refiner bars and the substrate define a groove between the adjacent refiner bars, wherein the refiner bars define a refining section of alternating refiner bars and grooves; and
a plurality transition bars disposed between radially outermost teeth and the refining section,
wherein the refining section is disposed closer to the second end of the side length than the dispersion section,
wherein the refiner bars in an area of alternating refiner bars and grooves have a refiner bar height,
wherein the tooth height exceeds the refiner bar height,
wherein the teeth on the first disperser assembly and the second disperser assembly intermesh to define a dispersion gap, and
wherein opposing refiner bars on the first disperser assembly and the second disperser assembly define a refining gap.

2. The disperser apparatus of claim 1, further comprising a deflector disposed between the dispersion section and the refining section.

3. The disperser apparatus of claim 1, wherein each tooth further comprises a leading side comprising multiple leading walls forming a concave shape.

4. The disperser apparatus of claim 1, wherein the teeth are at least 50% taller than the refiner bars.

5. The disperser apparatus of claim 1, wherein the teeth are at least 100% taller than the refiner bars.

6. The disperser apparatus of claim 1, wherein the tooth has a shape selected from the group consisting of: a cube, an elongated rectangular prism, a trapezoidal prism, a triangular prism, a pyramid, a truncated pyramid, and a pentagonal prism.

7. The disperser apparatus of claim 1, wherein the dispersion gap is further defined by a lateral inner wall and a lateral outer wall, and wherein the dispersion gap is adjusted 0.1 mm-0.4 mm for each millimeter of disperser apparatus adjustment, and the refining gap is adjusted 1 mm for each millimeter of disperser apparatus adjustment.

8. A disperser apparatus comprising:
a first disperser assembly having a center of rotation at an axis and being configured to rotate around the axis; and
a second disperser assembly facing the first disperser assembly,
wherein the first disperser assembly and the second disperser assembly each comprise:
a backing structure; and
a plurality of disperser-refiner plate segments annularly arranged and fixedly engaged to the backing structure,
wherein each of the disperser-refiner plate segments includes a substrate comprising:
teeth extending from the substrate, wherein the teeth are arranged in rows disposed at radial intervals, wherein each tooth in the teeth comprises:
a tooth height; and
walls; and
edges at junctions of adjacent walls,
wherein the teeth occupy an area on the substrate, and wherein the area defines a dispersion section;
refiner bars extending from the substrate, wherein adjacent refiner bars and the substrate define a groove between the adjacent refiner bars, wherein the refiner bars define a refining section of alternating refiner bars and grooves, wherein the refining section is distally disposed from the dispersion section,
wherein the refiner bars have a refiner bar height, and wherein the tooth height exceeds the refiner bar height; and
a deflector disposed between the dispersion section and the refining section.

9. The disperser apparatus of claim 8 wherein each of the disperser-refiner plate segments further comprise a transition bar disposed between a radially outermost tooth and the refining section.

10. The disperser apparatus of claim 8 wherein the teeth are at least 50% taller than the refiner bars.

11. The disperser apparatus of claim 8 wherein the teeth are at least 100% taller than the refiner bars.

12. The disperser apparatus of claim 8 wherein each tooth has a shape is selected from the group consisting of: a cube, an elongated rectangular prism, a trapezoidal prism, a triangular prism, a pyramid, a truncated pyramid, a pentagonal prism, or other polyhedron.

13. The disperser apparatus of claim 8 wherein each tooth further comprises a leading side comprising multiple leading walls forming a concave shape.

\* \* \* \* \*